Sept. 12, 1961         L. J. LECHTENBERG              2,999,562
                            AIR CLEANER Filed March 24, 1960                            3 Sheets-Sheet 1

Inventor
Leo J. Lechtenberg
By
Attorney

United States Patent Office 2,999,562
Patented Sept. 12, 1961

2,999,562
AIR CLEANER
Leo J. Lechtenberg, Elm Grove, Wis., assignor to Briggs & Stratton Corporation, Milwaukee, Wis., a corporation of Delaware
Filed Mar. 24, 1960, Ser. No. 17,401
7 Claims. (Cl. 183—44)

This invention relates to air cleaners such as are used for filtering the induction air for internal combustion engines, and refers more particularly to an air cleaner having a foam plastic filter element.

The general object of this invention is to provide an air cleaner which is well adapted for installation on internal combustion engines and which advantageously employs the desirable air filtering characteristics of urethane foam.

More specifically, it is an object of this invention to provide an air cleaner of the character described, comprising a foam plastic filter element and housing members which cooperate to define a casing that protectively encloses the filter element and cooperates with it to guide air in a predetermined path through the air cleaner, wherein a portion of the filter element provides a seal between the housing members by which air is prevented from bypassing the filter element and is thus compelled to follow said predetermined path through the cleaner, thereby assuring adequate filtration of the air.

In this connection it is an object of this invention to provide an air cleaner having a filter element of urethane foam or the like, which not only utilizes the excellent air filtering characteristics that such material possesses when in its uncompressed state but which also takes advantage of the substantially elastic compressibility of such material and its resistance to air flow when compressed to afford a seal between the members comprising the housing or casing that encloses the filter element.

Another object of this invention resides in the provision of an air cleaner of the character described having a foam plastic filter element, which air cleaner is adapted to be installed on a conventional upright combustion air inlet duct on an internal combustion engine and to be held in place by the stud which customarily extends coaxially upwardly from said duct, and wherein tightening of a nut on the upper end portion of said stud not only effects securement of the air cleaner onto the inlet duct but also effects compressive confinement of portions of the filter element between the members comprising the filter casing to provide a good seal between said members.

It is also an object of this invention to provide a filter element for an air cleaner of the character described, formed from a single piece of urethane foam or the like and which also provides a seal between cooperating members defining a housing or casing in which the filter element is enclosed.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
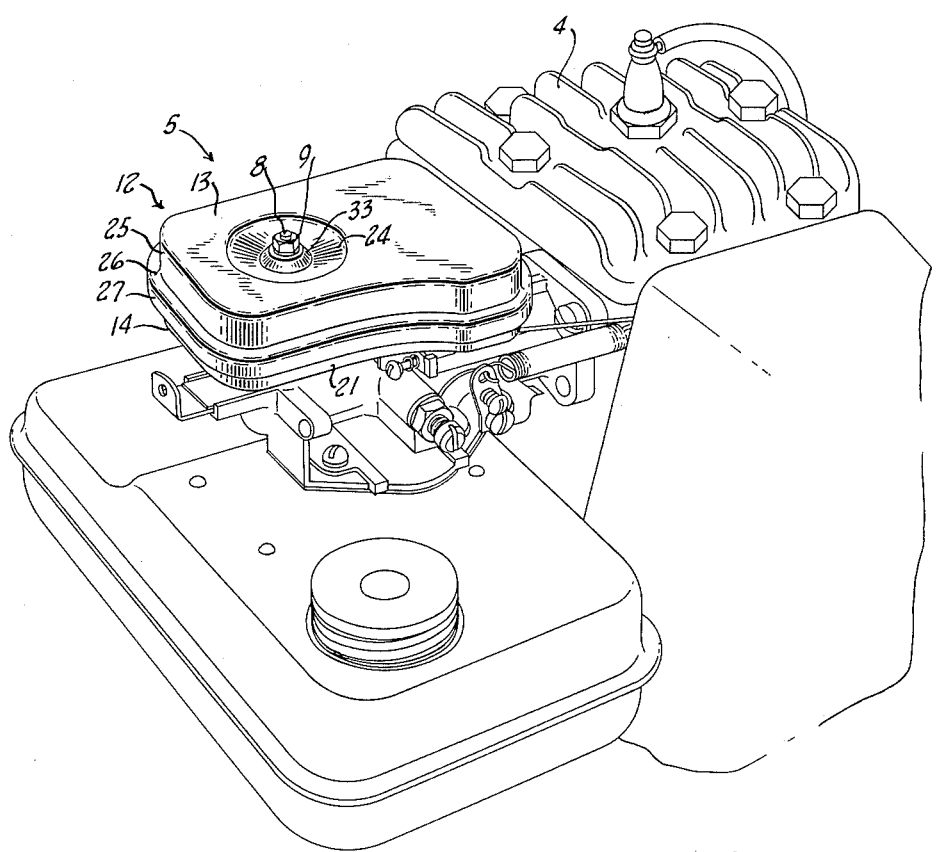
FIGURE 1 is a fragmentary perspective view of an internal combustion engine having an air cleaner of this invention installed thereon.
Figure 2:
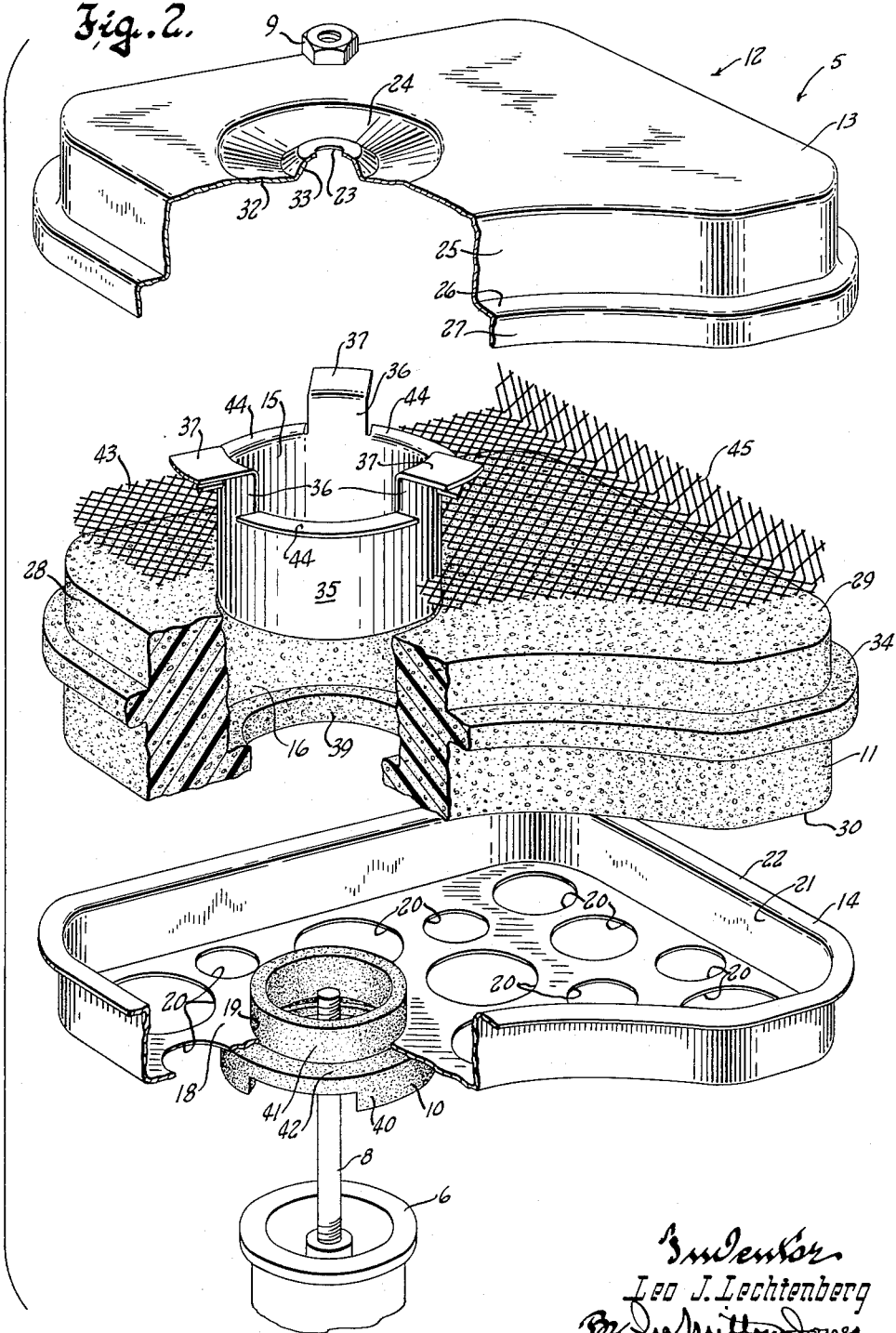
FIGURE 2 is a disassembled perspective view of the air cleaner of this invention, with portions shown broken away.

Referring now more particularly to the accompanying drawings, the numeral 5 designates generally an air cleaner embodying the principles of this invention, which is mounted on the upper end of an upright combustion air inlet duct 6 of an internal combustion engine 4 so as to filter combustion air for the engine before the same passes into the duct 6 and thence into the engine induction system. As is conventional, the duct has a spider-like support 7 therein, spaced below its upper inlet end, which receives the threaded lower end portion of a rod or stud 8 that projects above the duct and through the air cleaner, and by which the air cleaner is secured to the duct. A nut 9, threaded onto the projecting upper end portion of the stud, holds the air cleaner pressed downwardly into good sealing engagement with a resilient annular gasket 10 on the top of the filtered air duct. It will be understood that the attachment means provided by the stud 8 and nut 9 is merely illustrative, and that the air cleaner could be fastened to a filtered air duct of any sort by any suitable means.

The air cleaner itself comprises, in general, a filter element 11 of urethane foam or similar foam plastic material, an enclosure or casing 12 for the filter element comprising cooperating upper and lower housing members 13 and 14, and a substantially cylindrical supporting member or liner 15 which extends through a hole 16 in the filter element and forms an upward extension of the filtered air duct 6.

The enclosure 12 has a flat bottom wall 18 that comprises a part of the lower housing member 14 and which has numerous apertures, one of which, designated by 19, forms an air outlet port that registers with the upper end of the filtered air duct 6, while the remainder provide substantially evenly distributed air inlet ports 20. The lower housing member also has an imperforate side wall portion 21 that projects upwardly from the bottom wall 18 and terminates at its top in a laterally outwardly projecting flange 22 that extends all the way around the enclosure.

The top wall of the enclosure 12 comprises a part of the cover or upper housing member 13 and is imperforate except for a hole 23 coaxial with the air outlet port 19 through which the upper end portion of the stud 8 extends. Except for a dished area 24 around the hole 23, the top wall of the enclosure is flat. The upper housing member also includes an imperforate side wall portion 25 which extends downwardly from the top wall and which is in vertical alignment with the side wall portion 20 on the lower housing member at all points around the periphery of the enclosure. At its bottom the side wall portion 25 of the cover has a laterally outwardly projecting flange 26 which extends all the way around the cover and which flatwise opposes the flange 22 on the lower housing member. Projecting downwardly from the flange 26 on the upper housing member and extending entirely around the same is a lip or rim 27 that closely telescopingly embraces the outer edge of the flange 22 on the lower housing member to hold the housing members in vertical alignment.

It will be seen that each of the housing members 13 and 14 is bowl-shaped or cup-shaped and can readily be formed as a unitary stamping. As viewed from above, the enclosure may have a generally rectangular "free form" outline, as shown in the drawings, in order to enhance its appearance, or it could as well have a circular or other more conventional form.

Figure 3:
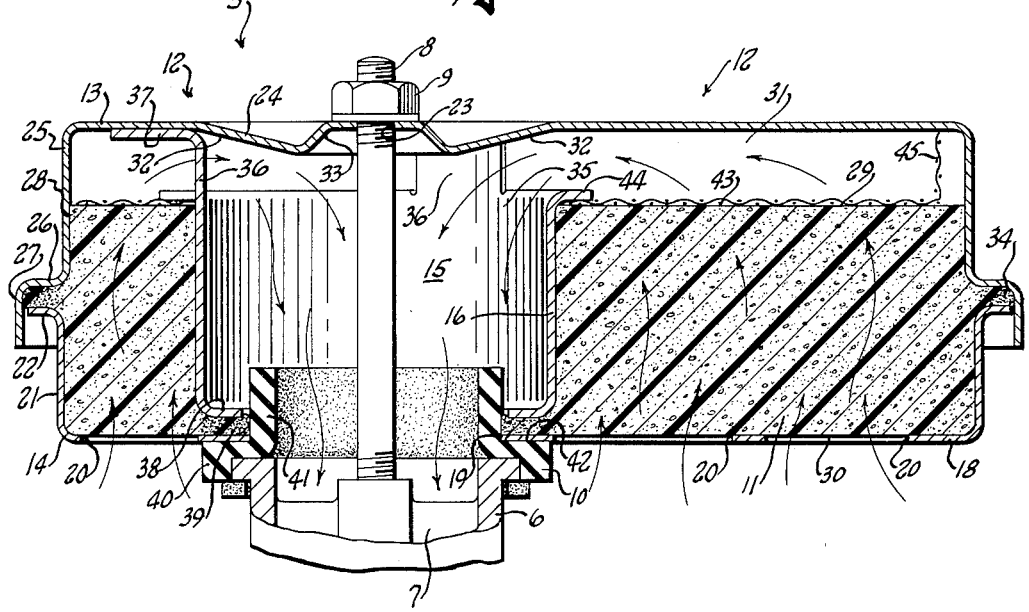
FIGURE 3 is a vertical sectional view through the air cleaner.

The filter element 11 has an outline which closely corresponds to the configuration of the side wall portions 21 and 25 of the housing members, so that its side surface 28 is in snug engagement with the side wall portions of the casing all around the same. The top and bottom surfaces 29 and 30 of the filter element are substantially flat and parallel to one another, and the hole 16 extends through the filter element from its top to its bottom surfaces, coaxially with the air outlet port 19 and the stud hole 23 in the top casing wall. The bottom surface 30 of the filter element rests on the bottom wall 18 of the enclosure, while its top surface 29 is spaced a substantial distance below the top enclosure wall 17 to cooperate therewith in defining a horizontal air passage 31 across the top of the filter. As indicated by the arrows in FIGURE 3, air flows upwardly through the filter element from the air inlet ports 20 in the bottom casing wall to the passage 31, and thence to the top of the filtered air duct extension provided by the liner or supporting member 15, through which the filtered air flows downwardly into the filtered air duct 6.

To guide air from the horizontal passage 31 downwardly into the liner 15 the radially outer portion of the circular dished area 24 of the top casing wall is inclined downwardly toward the center of said area, as at 32. The central portion 33 of the dished area is frusto-conical to guide the stud 8 through the hole 23 in the top wall as the air cleaner is assembled and to provide a seat for the nut 9. The entire dished area 24 also serves to stiffen the top casing wall to prevent it from being deformed by the downward force imposed by the nut 9.

Projecting laterally from the side surface of the filter element, intermediate the planes of its top and bottom surfaces, is an integral ridge 34 which extends entirely around the filter element and which is compressively confined between the opposing flanges 22 and 26 on the housing members. It will be seen that downward force upon the upper housing member due to tightening of the nut 9 causes the flanges on the two housing members to be clamped into tight sealing engagement with the ridge portion 34 of the filter element, collapsing the cellular cavities in the ridge to the point where no air can pass between the flanges, or at least to the extent that such air as may flow between the flanges must pass through extremely small pores which will in themselves assure adequate filtration of such air. The seal thus provided by the ridge 34 prevents unfiltered air from moving upwardly between the filter and the side wall portions of the casing, bypassing the filter and flowing directly to the passage 31.

The liner or supporting member 15 has an imperforate cylindrical wall portion 35 that fits snugly in the hole 16 in the filter element and extends substantially the full height thereof. Extending upwardly from this wall portion are a plurality of integral legs 36 terminating in outwardly bent feet 37 which flatwise engage the under side of the top casing wall 17, around the dished area 24 thereof; and at its bottom the liner or supporting member has a radially inwardly projecting circumferential flange 38. The filter element has a second integral ridge 39 at its bottom, projecting radially into the hole 16 and extending circumferentially around the same, and this second ridge is confined between the flange 38 on the supporting member and the bottom wall 18 of the casing, around the air outlet port 19 in the bottom wall. Downward force upon the top wall of the casing, exerted by the nut 9, is transmitted to the liner through its legs 36 and thus causes the liner to compress the ridge 39 on the filter element against the bottom casing wall so that said ridge on the filter element provides a good seal between the liner and the bottom casing wall.

The resilient gasket 10 has a large diameter portion 40 which snugly embraces the upper end portion of the filtered air duct 6 and a smaller diameter portion 41 which projects upwardly beyond the flange 38 on the supporting member and fits closely within the latter, to be snugly engaged by the inner edge of the compressed ridge 39 on the filter element. At the junction of its large and small diameter portions the gasket has an upwardly facing shoulder 42 upon which rests the bottom wall of the enclosure, with the gasket engaging the bottom wall around the air outlet aperture 19. It will be seen that the liner or supporting member 15 transmits the downward force upon the top casing wall 17, exerted by the nut 9, to the bottom casing wall 18, through the ridge 39 on the filter element, forcing the bottom casing wall into good sealing engagement with the shoulder 42 on the gasket, and at the same time the supporting member braces the top wall against downward dishing due to the pressure of the nut 9 thereon.

The liner or supporting member 15 may be omitted in cases where the filter element is formed by a molding operation, since urethane foam, when molded, has a crust on its surface, somewhat like that on a loaf of bread, which is non-porous. Thus if the hole 16 is formed to the desired size during molding of the element, the normal crust around the surface of the hole will define the required filtered air passage otherwise provided by the liner 15 and will prevent passage of air directly into said hole from the body of the filter element. Of course the crusts would have to be skived off of the top and bottom surfaces of such a molded element.

It has been found that the efficiency of the filter element in the air cleaner of this invention can be materially increased if it is lightly impregnated with oil. Because of the sponge-like nature of urethane foam, it soaks up a large amount of oil when immersed, but if it is thereafter gently squeezed or compressed, the oil remaining in the element will be substantially the correct amount for the purpose.

If desired a screen 43 may be provided that flatwise overlies the upper surface of the filter element. Outwardly bent lugs 44 on the supporting member, between the legs 36 thereon, flatwise overlie the screen to hold it in place, and a marginal edge portion of the screen may be bent up, as at 45, to engage the top wall of the enclosure and cooperate with the lugs 44 in preventing displacement of the screen.

From the foregoing description taken together with the accompanying drawings it will be apparent that this invention provides an air cleaner for the induction air of internal combustion engines and the like which incorporates a foam plastic filter element and which advantageously utilizes integral portions of the filter element to provide a seal between cooperating casing members that provide an enclosure for the filter element, by which seal air entering the air cleaner is prevented from bypassing the filter.

What is claimed as my invention is:

1. An air cleaner of the character described comprising: a cup-like lower housing member having an imperforate side wall and apertures in its bottom wall providing air inlet and outlet ports; a laterally outwardly projecting flange around the rim of the lower housing member, a foam plastic filter element entirely filling the lower housing member with the bottom of the element seated upon the bottom wall of the housing; an integral laterally outwardly projecting ridge extending around the perimeter of the filter element and overlying the flange on the lower housing member; the filter element having a hole therethrough in register with the air outlet port in the lower housing member; an imperforate liner in said hole in the filter element, the bottom end of the liner being contiguous to the bottom wall of the lower housing member; a cover member cooperable with the lower housing member and the filter element to constrain air entering the inlet port in the bottom wall of the lower housing member to flow upwardly through the filter element and then downwardly through said liner and the outlet port, said cover member having an imperforate top wall spaced above the top surface of the filter element and a laterally outwardly projecting peripheral flange on its lower edge which opposes the flange on the lower housing member and overlies the ridge on the filter element; and means for drawing the cover member bodily downwardly toward the lower housing member to cause the flange on the cover member to cooperate with the flange on the lower housing member in clampingly compressing said ridge on the filter to thus provide a seal between the lower housing member and the cover.

2. The air cleaner of claim 1, further characterized by: a second integral ridge at the bottom of the filter element projecting radially into the hole therethrough, around the entire circumference of said hole, and between the bottom end of the imperforate liner and the bottom wall of the lower housing member around the air outlet port; and spaced legs on said liner extending upwardly therefrom above the filter element and engaging the underside of the cover to force the liner downward as the cover member is drawn down towards the lower housing member, and thereby clampingly compress said second ridge against the bottom wall of the lower housing member, so that said second compressed ridge provides a seal between the liner and the lower housing member.

3. The air cleaner of claim 2, further characterized by: a screen overlying the filter element; and laterally outwardly projecting lugs on the liner, between said legs, overlying the screen to prevent upward displacement thereof.

4. An air cleaner adapted to be secured on the top of an upright filtered air duct having a coaxial stud extending upwardly therefrom, said air cleaner comprising: upper and lower housing members cooperating to define an enclosure having spaced apart top and bottom walls and a side wall extending around the enclosure, the bottom wall being seated on the filtered air duct and being apertured to provide air inlet port means and an air outlet port through which the interior of the enclosure communicates with the filtered air duct, and the top wall having an aperture through which the stud projects thereabove to receive a securement member which bears downwardly upon the top wall, but being otherwise imperforate; said upper and lower housing members having flatwise opposing adjacent peripheral flanges intermediate the top and bottom walls of the enclosure; a supporting member in the enclosure comprising an imperforate cylindrical wall portion which provides an upward extension of the filtered air duct, a radially inwardly projecting circumferential flange at the bottom of the cylindrical wall portion opposing the bottom wall of the enclosure around the marginal edge portion of the air outlet port, and legs projecting above said wall portion and engaging the underside of the top wall of the enclosure around said aperture therein to receive downward force exerted on the top wall by the securement member; and a foam plastic filter element having surfaces engaged with the side and bottom walls of the enclosure and with the imperforate wall portion of the supporting member entirely around the latter, and having its upper surface spaced below the top wall of the enclosure to provide a filtered air passage which opens to the interior of the supporting member between the legs thereof, said filter element having an integral radially inwardly projecting circumferential ridge compressively confined between said flange on the supporting member and the bottom wall of the enclosure to provide a seal therebetween, and having an integral laterally outwardly projecting ridge extending therearound and compressively confined between said opposing flanges on the upper and lower housing members to provide a seal between them.

5. The air cleaner of claim 4, further characterized by a lip projecting vertically from the radially outer edge of the flange on one of the housing members, past the flange on the other housing member, to cooperate with the outer edge of said flange on the other housing member in holding the housing members vertically aligned with one another.

6. In an air cleaner of the character described: a foam plastic filter element having spaced apart substantially parallel top and bottom surfaces and through which a vertical hole extends; a liner having an imperforate cylindrical wall closely engaging the entire surface of the hole in the filter element, the top and bottom ends of the liner being continguous respectively to the top and bottom surfaces of the filter element; telescoping upper and lower housing members substantially enclosing the filter element, the lower housing member having an imperforate side wall snugly engaging the sides of the filter element and a bottom wall which closely underlies the bottom surface of the filter element and which is apertured to provide air inlet means and an air outlet in register with said hole in the filter element, and the upper housing member providing a top wall spaced above the top surface of the filter element and cooperating therewith to provide an air passage from the top surface of the filter element to the upper end of said liner; bridging means between the upper housing member and the liner through which downward pressure on the upper housing member may be imparted to the liner; flatwise opposed laterally outwardly extending flanges on the telescopingly engaged portions of the upper and lower housing members; an integral laterally outwardly projecting ridge on the filter element, intermediate its top and bottom surfaces, compressively confined between said flanges on the housing members to provide a seal between them; and sealing means compressively confined between the bottom end of the liner and the bottom wall of the lower housing member.

7. The air cleaner of claim 6, wherein said sealing means is an annular ridge integral with the filter element and projecting radially in from the lower end of the hole therethrough.

References Cited in the file of this patent

UNITED STATES PATENTS

| | | |
|---|---|---|
| 1,958,735 | Worthington | May 15, 1934 |
| 2,904,129 | McMichael | Sept. 15, 1959 |
| 2,920,717 | Tuttle et al. | Jan. 12, 1960 |

FOREIGN PATENTS

| | | |
|---|---|---|
| 839,280 | Germany | May 19, 1952 |